United States Patent
Lim et al.

(10) Patent No.: US 11,014,403 B2
(45) Date of Patent: May 25, 2021

(54) SENSOR TARGET FOR WHEEL BEARING, MANUFACTURING METHOD OF SENSOR TARGET, AND WHEEL BEARING COMPRISING SENSOR TARGET

(71) Applicant: ILJIN GLOBAL CO., LTD, Seoul (KR)

(72) Inventors: Jong Keun Lim, Seoul (KR); Hyeon Ung Shin, Seoul (KR); Jee Hoon Oh, Seoul (KR)

(73) Assignee: ILJIN GLOBAL CO., LTD, Seoul (KR)

( * ) Notice: Subject to any disclaimer, the term of this patent is extended or adjusted under 35 U.S.C. 154(b) by 0 days.

(21) Appl. No.: 16/679,505

(22) Filed: Nov. 11, 2019

(65) Prior Publication Data

US 2020/0101791 A1   Apr. 2, 2020

Related U.S. Application Data

(63) Continuation of application No. PCT/KR2018/016529, filed on Dec. 21, 2018.

(30) Foreign Application Priority Data

Dec. 22, 2017 (KR) .................. 10-2017-0178607

(51) Int. Cl.
| | |
|---|---|
| *F16C 41/00* | (2006.01) |
| *B60B 27/00* | (2006.01) |
| *F16C 19/02* | (2006.01) |
| *G01D 5/12* | (2006.01) |

(52) U.S. Cl.
CPC .......... *B60B 27/0068* (2013.01); *F16C 19/02* (2013.01); *G01D 5/12* (2013.01)

(58) Field of Classification Search
CPC . B60B 27/0005; B60B 27/001; F16C 19/186; F16C 19/386; F16C 41/007; G01D 5/12; G01P 3/443
See application file for complete search history.

(56) References Cited

U.S. PATENT DOCUMENTS 3,960,248 A * 6/1976 Tribe ..................... B60T 8/329
                                                        188/181 R
3,963,219 A * 6/1976 D'Amico ............ E04H 17/1413
                                                        256/24

(Continued)

FOREIGN PATENT DOCUMENTS

| JP | H08136561 A | 5/1996 |
| JP | 2001027646 A | 1/2001 |

(Continued)

OTHER PUBLICATIONS

International Search Report for PCT/KR2018/016529 dated Apr. 10, 2019.

*Primary Examiner* — Phillip A Johnson
(74) *Attorney, Agent, or Firm* — Dinsmore & Shohl LLP; Yongsok Choi, Esq.

(57) ABSTRACT

A sensor target for a wheel bearing is provided. The sensor target is fixed to a bearing hub of a wheel bearing. The sensor target has a shaft and a magnet. The shaft is pressed into the bearing hub coaxially with a rotational axis of the bearing hub. The shaft has a recess at one end in the length direction. The magnet is pressed into the recess.

19 Claims, 13 Drawing Sheets

(56) References Cited

U.S. PATENT DOCUMENTS

| | | | | |
|---|---|---|---|---|
| 6,538,427 | B1* | 3/2003 | Silvasi | G01P 3/443 |
| | | | | 324/174 |
| 7,394,242 | B2* | 7/2008 | Pradier | G01P 3/487 |
| | | | | 324/174 |
| 8,327,697 | B2* | 12/2012 | McCann | B60T 8/171 |
| | | | | 73/115.08 |

FOREIGN PATENT DOCUMENTS

| | | | | |
|---|---|---|---|---|
| JP | 2008122268 | A * | 5/2008 | ............ F16C 41/007 |
| JP | 2012020690 | A | 2/2012 | |
| JP | 2015152121 | A | 8/2015 | |
| KR | 20110126665 | A | 11/2011 | |

\* cited by examiner

SENSOR TARGET FOR WHEEL BEARING, MANUFACTURING METHOD OF SENSOR TARGET, AND WHEEL BEARING COMPRISING SENSOR TARGET

CROSS-REFERENCE TO RELATED APPLICATIONS

This application is a continuation of International Application No. PCT/KR2018/016529 filed on Dec. 21, 2018, which claims priority to Korean Patent Application No. 10-2017-0178607 filed on Dec. 22, 2017, the entire contents of which are herein incorporated by reference.

TECHNICAL FIELD

The present disclosure relates to a sensor target for a wheel bearing, a manufacturing method of a sensor target, and a wheel bearing.

BACKGROUND ART

A wheel bearing for supporting a wheel of a vehicle are installed in a chassis of the vehicle. For example, the wheel bearing comprises a bearing hub, an inner ring, an outer ring, and rolling elements arranged between the bearing hub and the outer ring and between the inner ring and the outer ring and configured to perform rolling movement. The bearing hub is coupled to the wheel and is rotated together therewith. The bearing hub is coupled to a driven axle or a non-driven axle or is supported by the outer ring. The outer ring is coupled and fixed to a portion of the chassis.

A wheel sensor, which detects a rotation of the wheel to provide a signal to a vehicle control device or system, is mounted in the wheel bearing. As an example of the wheel sensor, a wheel speed sensor used in an anti-lock brake system has been known. In connection with the wheel speed sensor, a ring-shaped target with a plurality of magnetic pole pairs is installed in the inner ring of the wheel bearing and is rotated together with the inner ring. The wheel speed sensor detects a variation in magnetic field of the rotating target and provides a signal relating to the rotation of the wheel to the anti-lock brake system.

SUMMARY

It is difficult to implement a compact structure of the wheel bearing using the above-described target of the wheel speed sensor due to a shape and a mounting structure thereof. In order for a compact design of the wheel bearing, it is being attempted in the related art to directly fix the sensor target of the wheel sensor to the bearing hub of the wheel bearing. According to such an attempt, the sensor target may be directly attached to the bearing hub along a rotational axis of the bearing hub.

In order to achieve accurate detection of the wheel sensor while implementing a compact structure of the wheel bearing, minimization of a distance between the sensor target and the wheel sensor can be considered as an important design factor of the sensor target. Further, in consideration of a use environment in which the wheel bearing is used for a long period of time, a rotational center of the sensor target being reliably coincident with a rotational center of the wheel bearing for a long period of time and a fixed position of the sensor target being not varied can be considered as important design factors. However, the existing sensor target cannot achieve any of the above-described design factors to a satisfactory level.

Embodiments disclosed herein solve the above-described problems of the prior art. Embodiments disclosed herein provide a sensor target for a wheel bearing, which may be stably maintained on the wheel bearing without a position variation and may emit a magnetic field with high reliability for a long period of time, a manufacturing method of the sensor target, and a wheel bearing comprising the sensor target.

One aspect of the present disclosure is directed to a sensor target for a wheel bearing. The sensor target for a wheel bearing according to one embodiment may be fixed to a rotating element of the wheel bearing. The sensor target according to one embodiment may comprise a shaft and a magnet. The shaft may be configured to be press-fitted into the rotating element in coaxial with a rotational axis of the rotating element and may have a recess at one end in a length direction. The magnet may be fixed in the recess.

In one embodiment, at least one cut-out portion extending from the other end, which is opposite the one end, toward the one end in the length direction may be provided on an outer circumferential surface of the shaft. The cut-out portion may be configured to define an airflow passage between the rotating element and the shaft.

In one embodiment, the magnet may be press-fitted into the recess to be fixed in the recess. In this embodiment, at least one hole, which accommodates air compressed by the magnet, may be provided in the recess of the shaft.

In one embodiment, the sensor target may comprise a housing configured to cover the one end of the shaft and the magnet fixed in the recess. In this embodiment, the shaft may comprise a rotation preventing portion which is filled with a portion of the housing and prevents a rotation of the housing relative to the shaft. The rotation preventing portion may be formed of one among a concave portion, a hole, a cut-out portion, and a groove. Alternatively, the shaft may comprise a cut-out portion configured to define an airflow passage between the rotating element and the shaft on the outer circumferential surface, and the rotation preventing portion may be located at the opposite side of the cut-out portion based on a central axis of the shaft. Further, a flange protruding in an outward radial direction of the central axis of the shaft may be provided at the one end of the shaft, and the housing may be configured to cover the magnet and the flange.

Another aspect of the present disclosure is directed to a manufacturing method of a sensor target for a wheel bearing. A sensor target fixed to a rotating element of a wheel bearing may be manufactured by a manufacturing method of a sensor target according to one embodiment. In one embodiment, the manufacturing method of the sensor target may comprise providing a shaft configured to be press-fitted into the rotating element in coaxial with a rotational axis of the rotating element and having a recess at one end in a length direction, press-fitting a magnetizable metal piece into the recess, and magnetizing the metal piece.

In one embodiment, the providing of the shaft may comprise forming at least one cut-out portion extending from the other end, which is opposite the one end, toward the one end in the length direction on an outer circumferential surface of the shaft.

In one embodiment, the providing of the shaft may comprise forming at least one hole in the recess. Air in the recess, which is compressed by the metal piece, may be accommodated in the hole through the press-fitting of the magnetizable metal piece into the recess.

In one embodiment, before the magnetizing of the metal piece, the manufacturing method of the sensor target may comprise performing injection molding on one end of the shaft into which the metal piece is press-fitted to form a housing which covers the metal piece and the one end of the shaft.

In one embodiment, the providing of the shaft may comprise forming a rotation preventing portion, which is filled with molten plastic material, on the shaft.

In one embodiment, the manufacturing method of the sensor target may comprise aging the magnetized metal piece at a predetermined temperature.

Still another aspect of the present disclosure is directed to a wheel bearing. The wheel bearing according to one embodiment may comprise a bearing hub, an outer ring, a plurality of rolling elements, a sensor target, and at least one wheel sensor. The bearing hub may be configured to be coupled to a wheel of a vehicle and to be rotated with the wheel around a rotational axis. The outer ring may surround a portion of the bearing hub. The plurality of rolling elements may be disposed between the bearing hub and the outer ring. The sensor target may be fixed to the bearing hub. The at least one wheel sensor may be fixed relative to the bearing hub and may be configured to detect a rotation of the wheel by the sensor target. The sensor target may comprise a shaft and a magnet. The shaft may be configured to be press-fitted into the bearing hub in coaxial with the rotational axis. The shaft may comprise a recess located at one end in a length direction and at least one cut-out portion extending from the other end, which is opposite the one end, toward the one end in the length direction and located on an outer circumferential surface thereof. The magnet may be press-fitted in the recess.

In one embodiment, an airflow passage may be formed between the bearing hub and the shaft due to the cut-out portion.

In one embodiment, at least one hole, which accommodates air compressed by the magnet, may be provided in the recess of the shaft.

In one embodiment, the sensor target may comprise a housing configured to cover the one end of the shaft and the magnet press-fitted in the recess.

In one embodiment, the at least one wheel sensor may comprise a detection part facing the magnet in a direction of the rotational axis or in an outward radial direction of the rotational axis.

In accordance with one embodiment, since the shaft is press-fitted into the bearing hub, the sensor target can be stably fixed to the bearing hub for a long period of time, and a magnet can emit a magnetic field for a wheel sensor with high reliability for a long period of time. In accordance with one embodiment, the cut-out portion of the shaft can prevent movement or separation of the shaft, which may occur due to compressed air when the shaft is press-fitted. In accordance with one embodiment, the hole of the recess can prevent movement or separation of the magnet, which may occur due to compressed air when the magnet is press-fitted. In accordance with one embodiment, the housing of covering the press-fitted magnet can achieve a minimum distance between the wheel sensor and the magnet while preventing separation of the magnet. In accordance with one embodiment, the magnet of the sensor target can prevent thermal demagnetization over the service life of the wheel bearing.

DETAILED DESCRIPTION

Figure 1:
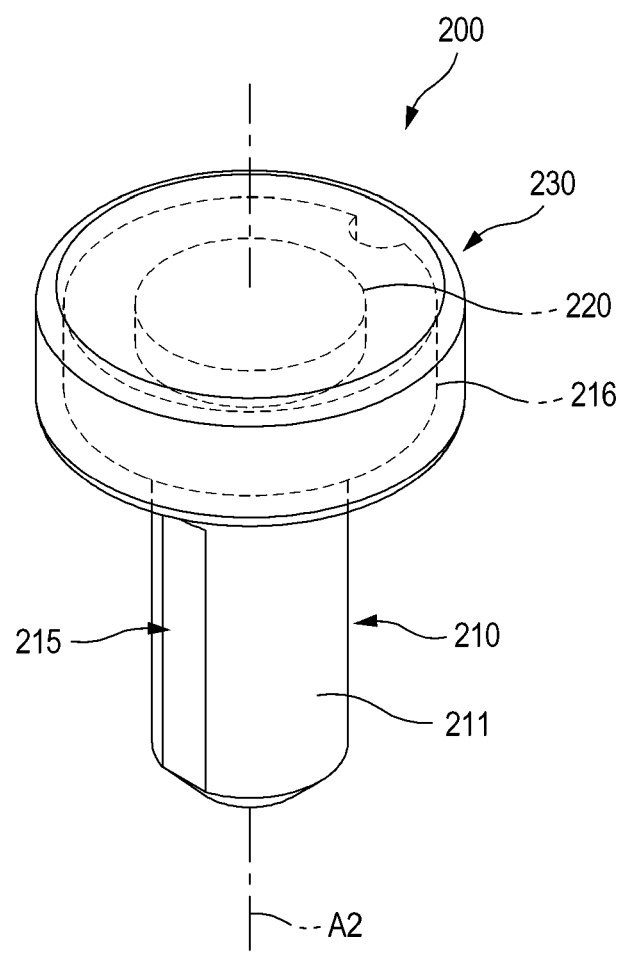
FIG. 1 is a perspective view illustrating a sensor target according to one embodiment of the present disclosure.

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including." "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Terms a "first," a "second," and the like are used to distinguish a plurality of components, and the order or importance of corresponding components is not limited by these terms.

Throughout the present disclosure, when a component is referred to as being "connected" or "coupled" to another component, the component can be directly connected or coupled to another component, or can be connected or coupled to another component by intervening yet another component therebetween.

A directional directive of an "outward radial direction" used herein means a direction away from a rotational axis with respect to the rotational axis of a rotating element, and a directional directive of an "inward radial direction" means a direction opposite the outward radial direction. Further, a directional directive of an "outward axial direction" used herein means a direction toward a wheel along the rotational axis, and a directional directive of an "inward axial direction" means a direction opposite to the outward axial direction along the rotational axis.

Hereinafter, embodiments will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though a description of a component is omitted, such a component is not intended to be excluded in any embodiment. Further, embodiments of a manufacturing method disclosed herein may comprise some or an entirety of operations shown in the drawings. The operations shown in the drawing may be sequentially performed, two or more operations in these operations shown in the drawing may be simultaneously performed, or one among the operations shown in the drawing may be performed in dependence on another operation.

The embodiments described below and the examples shown in the accompanying drawings relate to a sensor target for a wheel bearing, a manufacturing method of a sensor target, and a wheel bearing with a sensor target. Although the sensor target according to the embodiments may be manufactured by one among the embodiments of the manufacturing method disclosed herein, it is not intended that the sensor target according to the embodiments should be manufactured by one among the embodiments of the manufacturing method disclosed herein.

To explain a sensor target for a wheel bearing (hereinafter, simply referred to as a "sensor target") according to embodiments, FIGS. 1 to 3 will be referred. The sensor target according to the embodiments is fixed to a rotating element of a wheel bearing. The sensor target fixed to the rotating element is rotated together with the rotating element and serves as a target which is detected by a wheel sensor provided in the wheel bearing.

Figure 2:
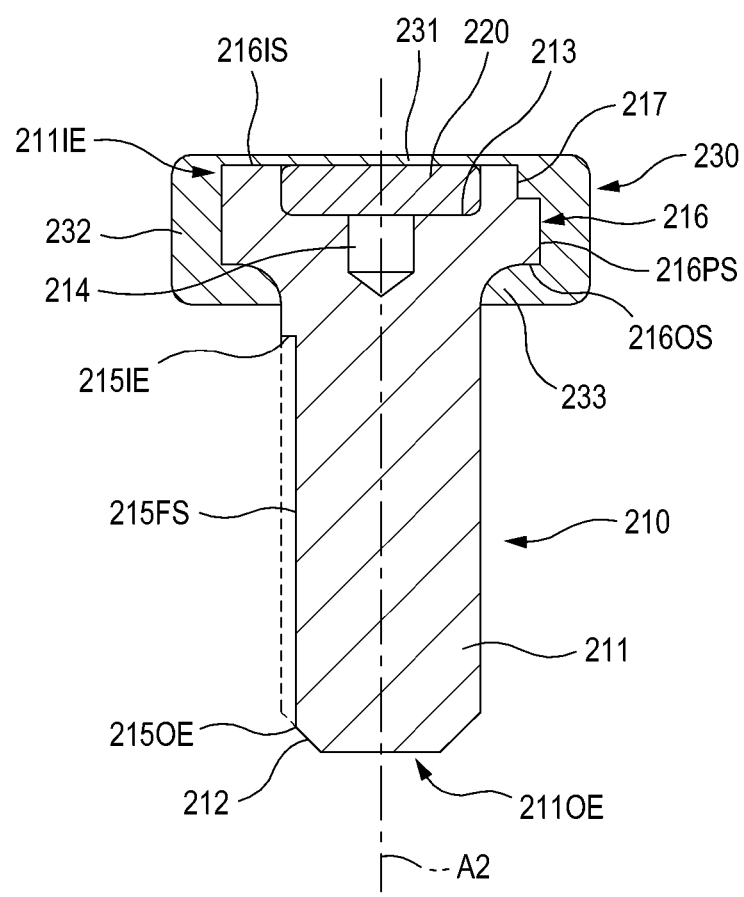
FIG. 2 is a longitudinal sectional view illustrating a sensor target for a wheel bearing according to one embodiment of the present disclosure.

As shown in FIGS. 1 and 2, a sensor target 200 according to one embodiment comprises a shaft 210 and a magnet 220. The shaft 210 has a cylindrical body 211. Further, the shaft 210 has a central axis A2 extending in a longitudinal direction of such a cylindrical shape and passing through a center of a circular cross section thereof and comprises one end 211IE and the other end 211OE opposite each other in the longitudinal direction. An inclined circumferential surface 212, which is inclined with respect to the central axis A2, is formed on the other end 211OE of the shaft 210. The magnet 220 is fixed to the one end 211IE of the shaft 210 in the longitudinal direction. Since the shaft 210 is rotated together with the rotating element of the wheel bearing, a magnetic field of the magnet 220 is varied according to the rotation of the shaft 210. The wheel sensor provided in the wheel bearing may detect a variation in magnetic field of the magnet 220.

In one embodiment, the shaft 210 may be made of a metal material or a plastic material which does not vary or affect the magnetic field. For example, the shaft 210 may be made of stainless steel (e.g., stainless steel of SUS304).

In one embodiment, at least one cut-out portion 215 is provided on an outer circumferential surface of the shaft 210. According to the embodiment shown in FIGS. 2 and 3, the cut-out portion 215 extends to one end 211IE of the shaft 210 from the other end 211OE thereof on the outer circumferential surface of the shaft 210. The cut-out portion 215 defines an airflow passage which allows a flow of air between the rotating element and the shaft 210.

Figure 3:
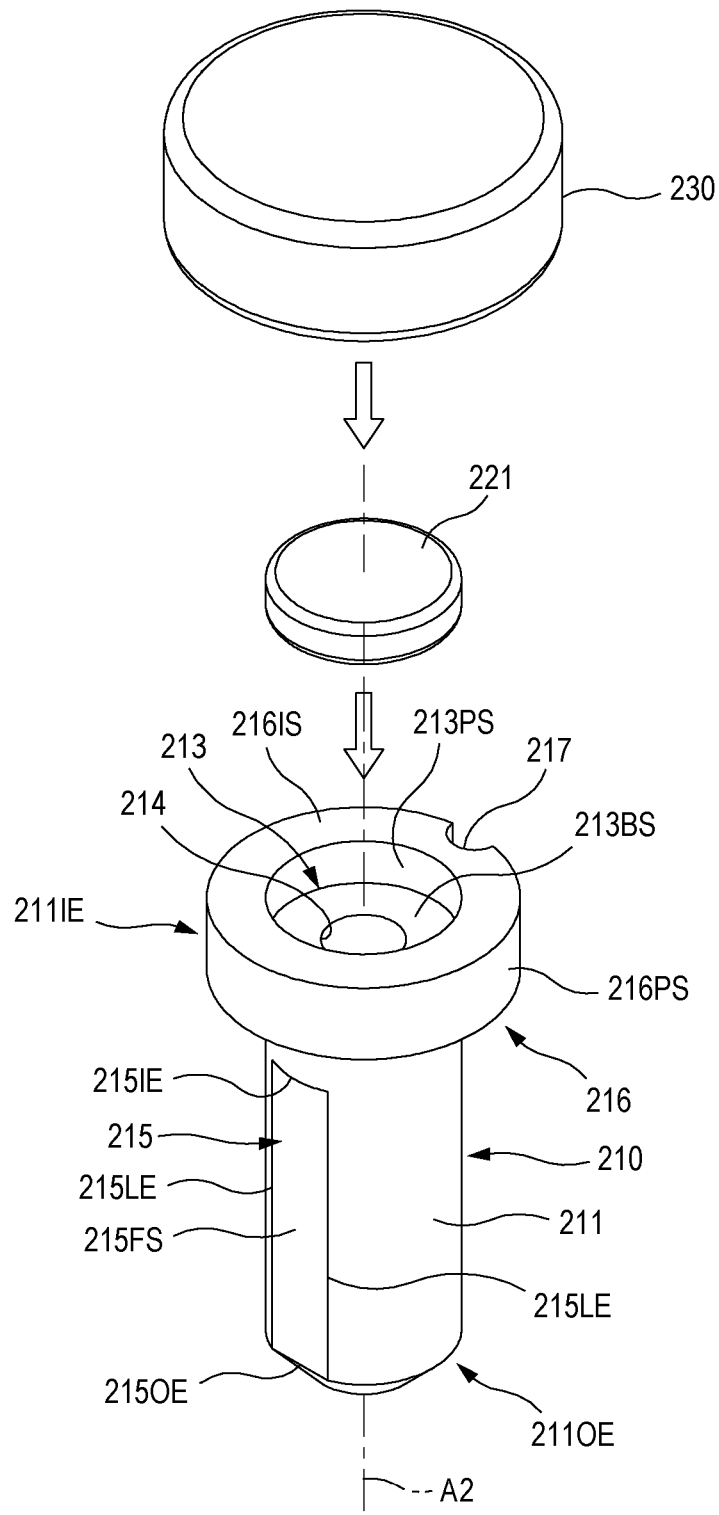
FIG. 3 is a perspective view illustrating a shaft, a metal piece and a housing in a sensor target for a wheel bearing according to one embodiment of the present disclosure.

In the embodiment shown in FIGS. 2 and 3, one cut-out portion 215 is provided on the outer circumferential surface of the shaft 210 (an outer circumferential surface of the body 211). The cut-out portion 215 may be formed by cutting a portion of the cylindrical body 211, of which a transverse sectional shape is an approximately D shape, in a length direction. As a result, the cut-out portion 215 comprises a flat surface 215FS which forms a portion of the outer circumferential surface of the shaft 210, one end 215IE close to one end 211IE of the shaft 210, and the other end 215OE located at the other end 211OE of the shaft 210. Further, as shown in FIG. 3, the cut-out portion 215 has a pair of edges 215LE parallel to the central axis A2.

In one embodiment, a flange 216 may be provided at one end 211IE of the shaft 210.

According to the embodiment shown in FIGS. 1 and 3, the flange 216 has an annular shape and protrudes in an outward radial direction of the central axis A2 of the shaft 210. The flange 216 has a diameter that is greater than that of the body 211 of the shaft 210. According to the embodiment shown in FIG. 2, the flange 216 comprises one end surface 216IS located in the length direction of the shaft 210, the other end surface 216OS opposite one end surface 216IS along the central axis A2, and an annular-shaped circumferential surface 216PS extending between one end surface 216IS and the other end surface 216OS. One end surface 216IS of the flange 216 forms a part of one end 211IE of the shaft 210. Alternatively, one end surface 216IS of the flange 216 may be spaced apart from one end 211IE of the shaft 210 toward the other end 211OE. According to such an embodiment, an annular-shaped step portion may be formed between one end 211IE of the shaft 210 and one end surface 216IS of the flange 216.

In one embodiment, the shaft 210 comprises a recess 213 configured to fix the magnet 220 to the shaft 210. The recess 213 is located at one end 211IE of the shaft 210 and is concave toward the other end 211OE. According to the embodiment shown in FIGS. 2 and 3, the recess 213 is concave in a disc shape, and a center of the disc shape is located on the central axis A2. Accordingly, the recess 213 has an annular-shaped circumferential surface 213PS and a circular-shaped bottom surface 213BS. A depth of the recess 213 is determined such that the magnet 220 does not protrude over one end 211IE of the shaft 210.

In one embodiment, the magnet 220 may be made of an alloy containing a metal material such as neodymium, iron, boron, or the like. For example, a magnet, which is made of the alloy and is magnetized with an N pole and an S pole, may be used as the magnet 220. Alternatively, the magnet 220 may be formed such that a metal piece 221 made of the alloy and having a dimension of the magnet 220 is press-fitted into the recess 213 (see FIG. 3), and then the metal piece 221 is magnetized so as to have an N pole and an S pole.

In one embodiment, the magnet 220 may be fixed by being press-fitted into the recess 213 along the central axis A2. The recess 213 and the magnet 220 are configured such that the magnet 220 is gaplessly press-fitted into the recess 213 along the central axis A2. Referring to the embodiment shown in FIGS. 1 and 2, the magnet 220 has a disc shape, and a center of the disc shape is located on the central axis A2. In the magnet 220, a semi-circular half portion may be an N pole and the other semi-circular half portion may be an S pole. A diameter of the magnet 220 or a diameter of the recess 213 is determined to achieve a fit by press-fitting between the magnet 220 and the recess 213.

In one embodiment, the shaft 210 may comprise at least one hole 214 for accommodating air, which is compressed by the magnet 220, in the recess 213. The hole 214 may be formed to penetrate from a surface of the recess 213 (e.g., the circumferential surface 213PS or the bottom surface 213BS of the recess 213) toward an interior of the shaft 210. In the embodiment shown in FIGS. 2 and 3, one hole 214 is formed in the recess 213, and the hole 214 penetrates from the bottom surface 213BS of the recess 213 into the body 211 along the central axis A2. When the magnet 220 is gaplessly press-fitted into the recess 213, the air in the recess 213 is compressed by the magnet 220. The air compressed by the magnet 220 may apply a pressure to the magnet 220, thereby acting to push the magnet 220 from the recess 213. However, according to one embodiment, since the air compressed by the magnet 220 flows into the hole 214, the magnet 220 is maintained at a position that the press-fitting of the magnet 220 in the recess 213 is completed.

In one embodiment, the sensor target 200 may comprise a housing 230 which covers at least the magnet 220 fixed in the recess 213 and one end 211IE of the shaft 210. For example, the housing 230 may be formed by injection molding a plastic material to one end 211IE of the shaft 210, into which the magnet 220 is press-fitted.

According to the embodiment shown in FIGS. 2 and 3, the housing 230 is formed so as to cover the magnet 220 fixed in the recess 213, one end 211IE of the shaft 210, and the flange 216. The housing 230 has a disc shape with a diameter that is greater than that of the flange 216. The housing 230 comprises a disc portion 231, a cylindrical portion 232, and an annular portion 233, which are integrally formed. The disc portion 231 covers the magnet 220 and one end 211IE of the shaft 210 (one end surface 216IS of the flange 216). The cylindrical portion 232 covers the circumferential surface 216PS of the flange 216. The annular portion 233 covers the other end surface 216OS of the flange 216 and a portion of the body 211. Since the housing 230 covers the magnet 220, the magnet 220 may be permanently maintained in the recess 213 without being separated from the recess 213 of the shaft 210.

A dimension of the housing 230 may be determined to have strength for preventing separation of the magnet 220 and preventing the housing 230 from being separated from one end 211IE of the shaft 210. For example, a thickness of the disc portion 231 along the central axis A2 may be about 0.6 mm or less, but a maximum thickness of the disc portion 231 is not limited to such numerical values. The thickness of the disc portion 231 may be set to an appropriate numerical value as long as the housing 230 is formed to cover the magnet 220 and the wheel sensor can detect a variation in magnetic field of the magnet 220 with a desired resolution.

In one embodiment, the shaft 210 may comprise a rotation preventing portion 217 for preventing a rotation of the housing 230 with respect to the shaft 210. A portion of the housing 230 fills the rotation preventing portion 217 such that engagement between the rotation preventing portion 217 and the said portion of the housing 230 is achieved. Accordingly, the rotation of the housing 230 with respect to the shaft 210 may be prevented.

According to the embodiment shown in FIGS. 2 and 3, the rotation preventing portion 217 is formed as a concave portion which is roughly semi-circular and is concaved from one end surface 216IS and the circumferential surface 216PS of the flange 216. When the housing 230 is formed by injection molding, a material forming the housing 230 flows into the rotation preventing portion 217 and cured therein such that a rotation prevention structure is implemented between the shaft 210 and the housing 230.

In one embodiment, as shown in FIGS. 2 and 3, the rotation preventing portion 217 may be located at a side opposite the cut-out portion 215 based on the central axis A2 of the shaft 210. According to the embodiment shown in FIGS. 2 and 3, the cut-out portion 215 and the rotation preventing portion 217 are located to be opposite each other in the radial direction of the shaft 210 based on the central axis A2 of the shaft 210. Owing to a cut-out structure such as the cut-out portion 215 or the rotation preventing portion 217, when the shaft 210 is rotated together with the rotating element of the wheel bearing, an eccentric force may act on the shaft 210. However, since the cut-out portion 215 and the rotation preventing portion 217 are located to be opposite each other in the radial direction of the shaft 210, the eccentric force does not act on the shaft 210 and eccentricity of the shaft 210 may be prevented.

Figure 4:
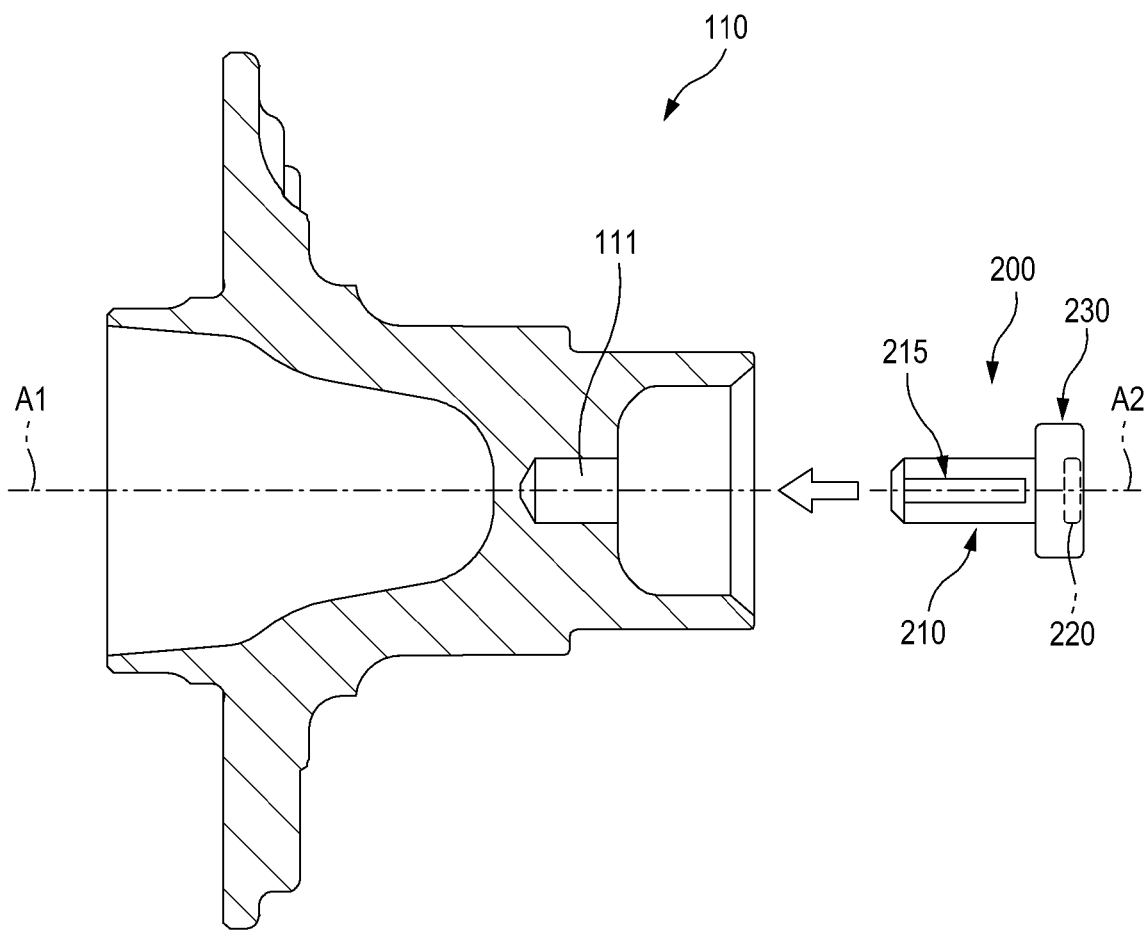
FIG. 4 is a side view illustrating a bearing hub and a sensor target for a wheel bearing according to one embodiment of the present disclosure.

With respect to engagement between the rotating element of the wheel bearing and the sensor target 200 according to one embodiment. FIG. 4 may be referred. FIG. 4 illustrates a bearing hub of the wheel bearing as an example of the rotating element.

The shaft 210 of the sensor target 200 is partially inserted into a bearing hub 110 along a rotational axis A1 of the bearing hub 110 (or a rotational axis of the wheel bearing). Since the shaft 210 is rotated together with a rotation of the bearing hub 110, a magnetic field of the magnet 220 is varied according to the rotation of the bearing hub 110. A variation in magnetic field of the magnet 220 may be detected by the wheel sensor.

In one embodiment, the shaft 210 is configured to be press-fitted into a target mounting bore 111 of the bearing hub 110. The shaft 210 is press-fitted into the target mounting bore 111 in coaxial with the rotational axis A1. Thus, the shaft 210 is press-fitted into the target mounting bore 111 such that the central axis A2 becomes coaxial with the rotational axis A1. An inner diameter of the target mounting bore 111 or a diameter of the shaft 210 is determined such that a fit (e.g., an interference fit) is made between the target mounting bore 111 and the shaft 210 due to a press fit.

Figure 5:
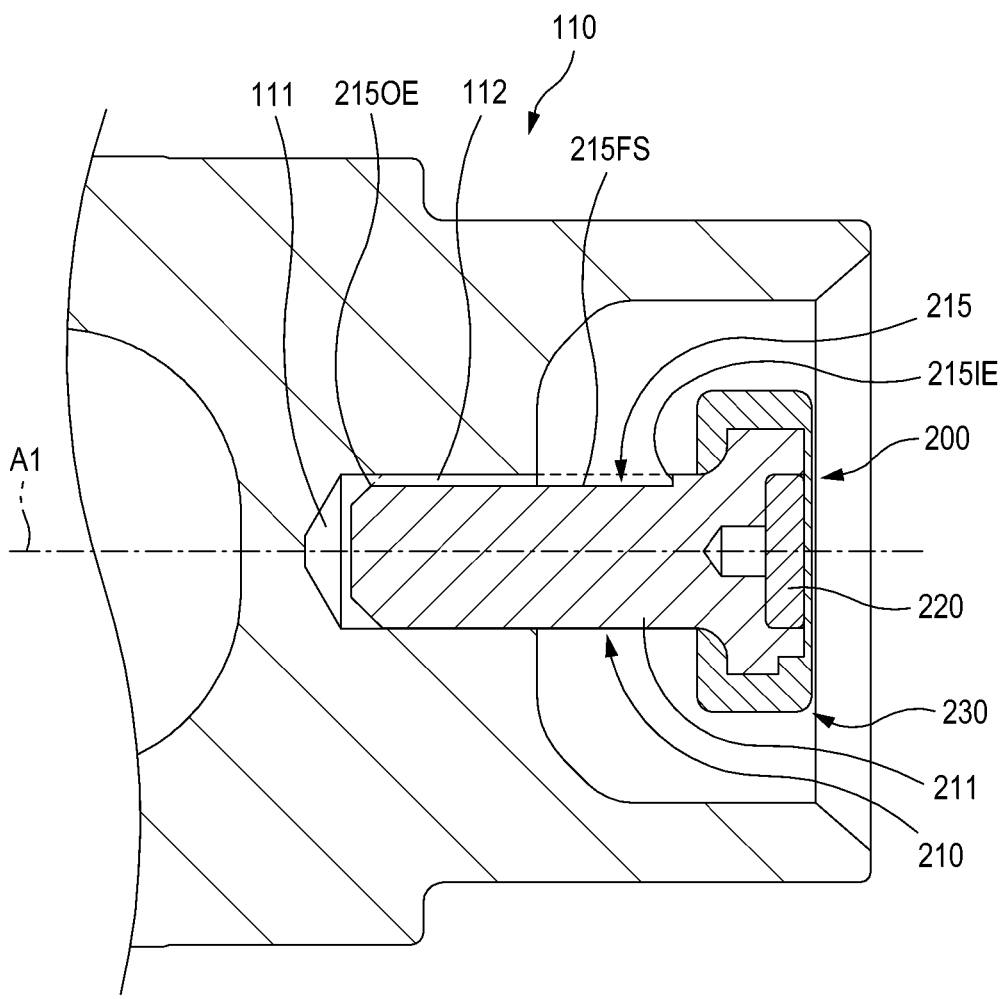
FIG. 5 is a longitudinal sectional view illustrating a sensor target for a wheel bearing according to one embodiment of the present disclosure, which is press-fitted into a bearing hub.
Figure 6A:
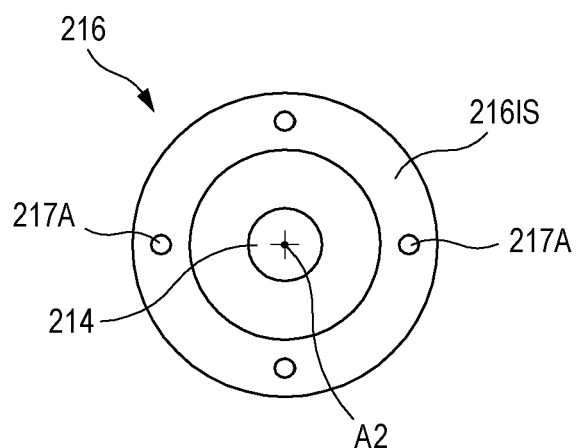
FIG. 6A schematically illustrates a modification of a rotation preventing portion.
Figure 6B:
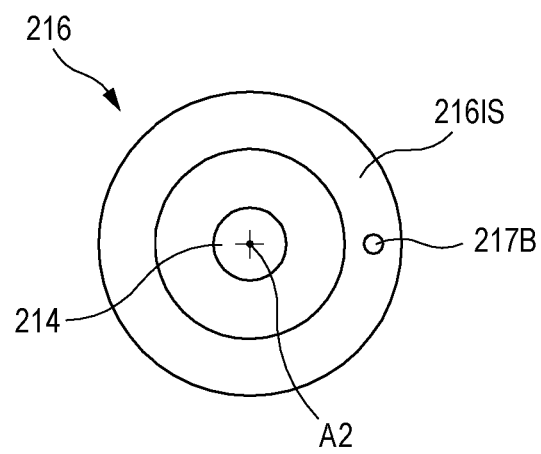
FIG. 6B schematically illustrates a modification of a rotation preventing portion.
Figure 6C:
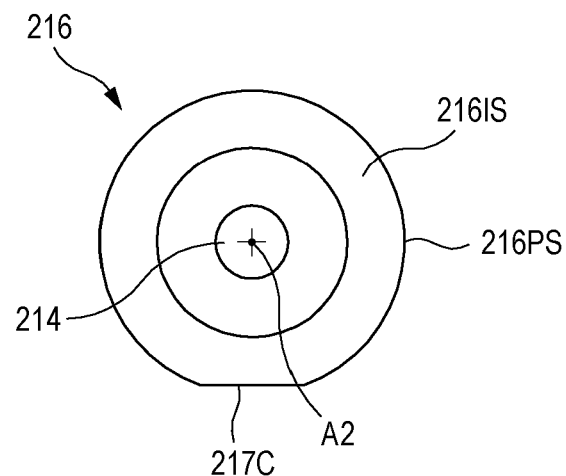
FIG. 6C schematically illustrates a modification of a rotation preventing portion.
Figure 6D:
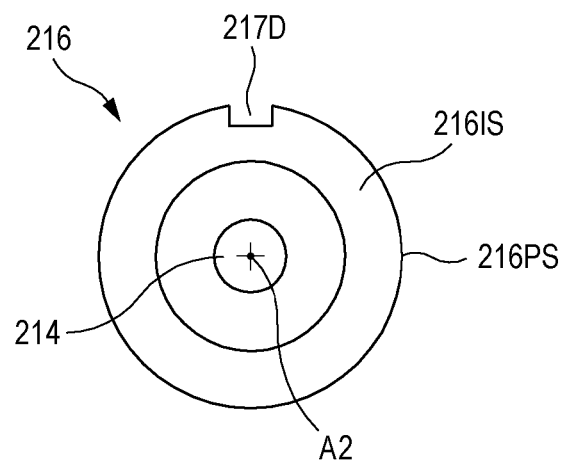
FIG. 6D schematically illustrates a modification of a rotation preventing portion.

FIG. 5 illustrates a portion of the bearing hub and the sensor target according to one embodiment press-fitted into the bearing hub.

Referring to the embodiment shown in FIG. 5, a portion of the shaft 210 (a portion of the body 211) is press-fitted into the target mounting bore 111. In a state that a portion of the shaft 210 is press-fitted into the target mounting bore 111 in a desired depth, one end 215IE of the cut-out portion 215 is located outside the target mounting bore 111, and the other end 215OE of the cut-out portion 215 is located inside the target mounting bore 111. Accordingly, the cut-out portion 215 may define an airflow passage 112 which allows a flow of air between the bearing hub 110 and the shaft 210. That is, when the shaft 210 is press-fitted into the bearing hub 110, the airflow passage 112 through which the target mounting bore 111 and the outside of the bearing hub 110 communicate is defined between a surface of the cut-out portion 215 and an inner circumferential surface of the target mounting bore 111. Further, the shaft 210 is press-fitted into the target mounting bore 111 through gapless fitting except for the cut-out portion 215.

When the shaft 210 is press-fitted into the target mounting bore 111 with gapless fitting, an end surface of the other end 211OE of the shaft 210 compresses the air in the target mounting bore 111 (see FIG. 2). Assuming that the shaft does not have the cut-out portion 215, the shaft receives a pressure from the air compressed by press-fitting, and the pressure acts to push the shaft from the target mounting bore 111. However, in the shaft 210 of one embodiment having the cut-out portion 215, when the shaft 210 is press-fitted, the air in the target mounting bore 1 may be discharged to the outside of the target mounting bore 111 through the airflow passage 112 which is formed by the cut-out portion 215. Therefore, according to one embodiment, the shaft 210 which is press-fitted into the target mounting bore 111 of the bearing hub 110 may be permanently maintained at a position that the press-fitting is completed.

FIGS. 6A to 6D illustrate various modifications of the rotation preventing portion. According to an embodiment shown in FIG. 6A, a rotation preventing portion 217A is formed as a plurality of concave portions which are recessed from one end surface 216IS of the flange 216. According to an embodiment shown in FIG. 6B, a rotation preventing portion 217B is formed as a penetrated hole, which passes or does not pass through the flange 216, from one end surface 216IS of the flange 216. According to an embodiment shown in FIG. 6C, a rotation preventing portion 217C is formed as a cut-out portion which is formed on the circumferential surface 216PS of the flange 216. According to an embodiment shown in FIG. 6D, a rotation preventing portion 217D is formed as a groove which is concave inward the flange 216 from the circumferential surface 216PS of the flange 216. The shape of the rotation preventing portion is not limited to the shapes shown in FIGS. 6A to 6D. The rotation preventing portion of the shaft may include any shape which is capable of preventing a relative rotation between the housing and the shaft.

In order to explain a manufacturing method of the sensor target according to the embodiments. FIGS. 2 to 4 and FIGS. 7 to 10 may be referred.

Figure 7:
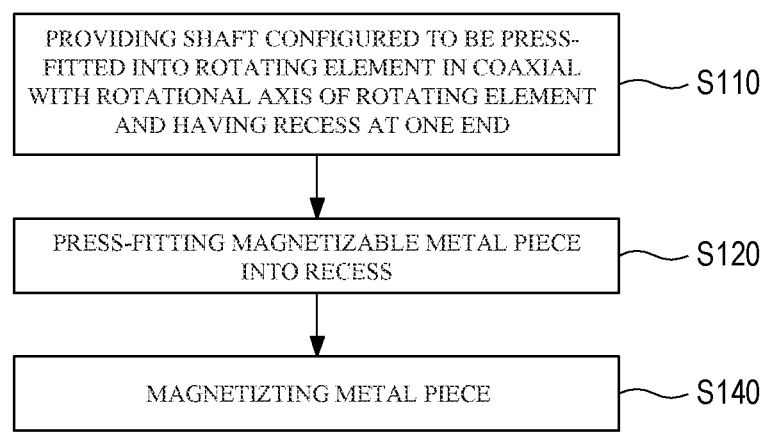
FIG. 7 is a block diagram illustrating a manufacturing method of a sensor target according to one embodiment of the present disclosure.

As shown in a block diagram of FIG. 7, a manufacturing method of the sensor target according to one embodiment comprises providing a shaft 210 configured to be press-fitted into a rotating element (e.g., the bearing hub 110) in coaxial with the rotational axis A1 and having the recess 213 at one end 211IE in the length direction (S110), press-fitting a magnetizable metal piece 221 into the recess 213 (S120), and magnetizing the metal piece 221 (S140).

In connection with operation S110, the shaft 210 may be made of a nonmagnetic metal material (e.g., stainless steel) or a high strength plastic material, which does not affect a magnetic field. The shaft 210 having the above-described body 211 and the above-described recess 213 may be formed by casting, forging, cutting, or the like. Alternatively, the shaft 210 having the above-described body 211, the above-described recess 213, and the above-described flange 216 may be formed by casting, forging, cutting, or the like.

Figure 8:
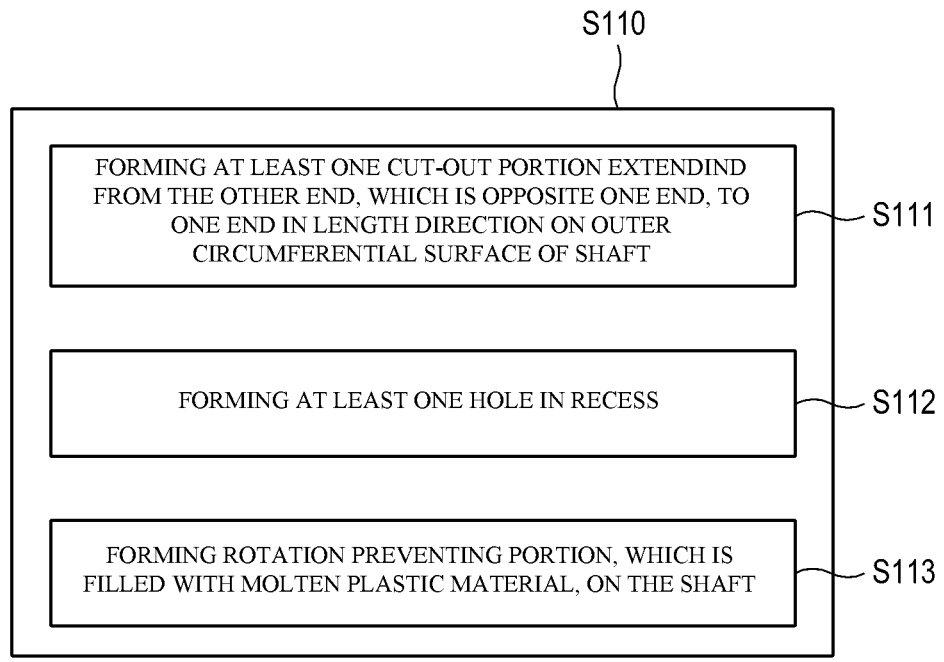
FIG. 8 is a block diagram illustrating manufacturing steps which may be performed in a shaft providing operation according to one embodiment of the present disclosure.

As shown in a block diagram of FIG. 8, operation S110 may comprise forming at least one cut-out portion 215 on an outer circumferential surface of the shaft 210 (S111), forming at least one hole 214 in the recess 213 (S112), and forming the rotation preventing portion 217 on the shaft 210 (S113). These operations S111, S112, and S113 may be selectively performed in operation SI 10 according to the embodiments of the sensor target.

In operation S111, the cut-out portion 215 is formed to extend to one end 211IE of the shaft 210 from the other end 211OE of the shaft 210. The cut-out portion 215 may be formed by removing a portion of a D-shaped transverse section from the body 211 of the shaft 210. For example, cutting, grinding, or the like may be performed to form the cut-out portion 215. Alternatively, when the shaft 210 is molded, the cut-out portion 215 may be formed using a mold which includes a shape part corresponding to the cut-out portion 215.

In operation S112, the hole 214 is formed to penetrate from a surface of the recess 213 (e.g., the bottom surface 213BS of the recess 213) toward the other end 211OE of the shaft 210. For example, the hole 214 may be formed by drilling. Alternatively, when the shaft 210 is molded, the hole 214 may be formed using a mold which includes a shape part corresponding to the hole 214.

In operation S113, the rotation preventing portion 217 shown in FIG. 3 or the rotation preventing portion 217A. 217B, 217C, or 217D shown in FIGS. 6A to 6D, which is filled with a molten plastic material during injection molding, is formed in the shaft 210. When the shaft 210 is molded, the rotation preventing portion 217, 217A, 217B, 217C, or 217D may be formed using a mold with a shape part corresponding to the rotation preventing portion 217, 217A. 217B. 217C, or 217D. Alternatively, the rotation preventing portion 217, 217A. 217B, 217C, or 217D may be formed by cutting, drilling, or the like.

The metal piece 221 is fixed in the recess 213 of the shaft 210 through operation S120 of press-fitting the metal piece 221 into the recess 213. The metal piece 221 is made of the above-described alloy material. The metal piece 221 has the same shape as the above-described magnet 220. The recess 213 and the metal piece 221 have dimensions such that the metal piece 221 is press-fitted into the recess 213. The press-fitting of the metal piece may be performed in a manner such that the metal piece 221 is pressurized into the recess 213 by a press apparatus in a state that the shaft 210 is fixed with a jig. In an embodiment comprising operation S112 of forming the hole 214 in the recess 213, air in the recess 213, which is compressed by the metal piece 221, is accommodated in the hole 214 through operation S20.

In operation S140, the metal piece 221 is magnetized by, e.g., a magnetizing yoke so as to have an N pole and an S pole and output a desired level of a magnetic force. As a result, the metal piece 221 may become the above-described magnet 220.

Figure 9:
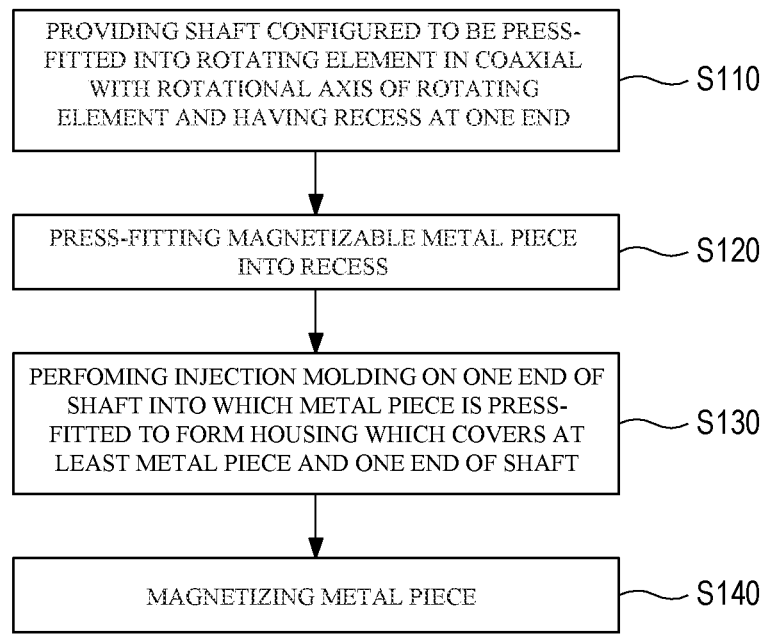
FIG. 9 is a block diagram illustrating a manufacturing method of a sensor target according to one embodiment of the present disclosure.

In one embodiment, as shown in a block diagram of FIG. 9, the manufacturing method of the sensor target comprises forming the above-described housing 230 (S130) before operation S140 of magnetizing the metal piece 221. The housing 230 is made of a plastic material. The housing, which covers at least one end 211IE of the shaft 210 and the metal piece 221 so as to prevent separation of the metal piece 221, may be formed by arranging one end 211IE of the shaft 210, into which the metal piece 221 is press-fitted, and a portion of the shaft 210 adjacent to one end 211IE into a mold and then injection-molding a plastic material. Alternatively, in the embodiment that the shaft 210 comprises the above-described flange 216, the housing 230 covering an entirety of the flange 216 may be formed in operation S130. Through operation S130 of forming the housing 230, the plastic material constituting the housing 230 flows into the rotation preventing portion 217 and is cured in the rotation preventing portion 217 such that a structure for preventing a rotation of the housing 230 relative to the shaft 210 is implemented. In the present embodiment, operation S140 of magnetizing the metal piece 221 is performed after operation S130 of forming the housing 230. Therefore, it is possible to prevent the magnet 220 from causing thermal demagnetization due to a high temperature in the process of forming the housing 230.

Figure 10:
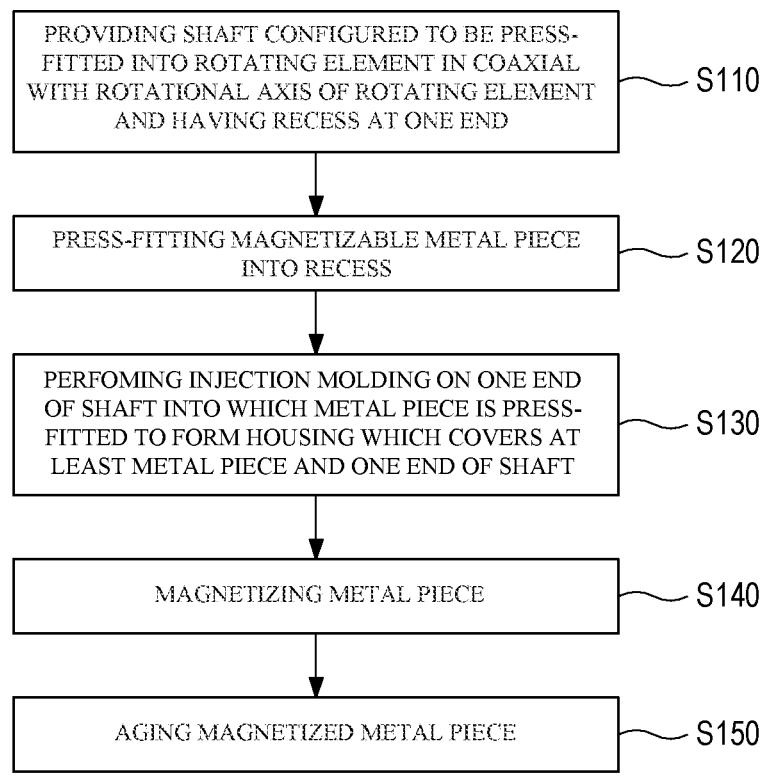
FIG. 10 is a block diagram illustrating a manufacturing method of a sensor target according to one embodiment of the present disclosure.

In one embodiment, as shown in a block diagram of FIG. 10, the manufacturing method of the sensor target comprises aging the magnetized metal piece 221 at a predetermined temperature (S150) after operation S140 of magnetizing the metal piece 221. The magnet 220 formed by the magnetized metal piece 221 through operation S150 may stably generate a magnetic field without thermal demagnetization even when the wheel bearing is used at a high temperature for a long period of time.

A temperature range in a use environment of the wheel bearing may be from a room temperature to a high temperature. While the wheel bearing is used, the wheel bearing is exposed to a high temperature for a long period of time due to elements which are frictionally rotated, and the high temperature may be about 150° C. Owing to the high temperature applied to the wheel bearing, the sensor target 200 is also influenced by the high temperature. Thermal stability of the magnet 220 is degraded due to the influence of the high temperature such that the magnet 220 is prone to cause irreversible thermal demagnetization. In the present embodiment, the magnet 220 formed by the magnetized metal piece 221 is aged for a predetermined period of time at a predetermined temperature that is higher than a high temperature at which the wheel bearing is used. When a magnetic force output of the aged magnet 220 is not degraded below a desired level, the manufacture of the sensor target 200 with such a magnet 220 may be completed. Alternatively, in this regard, in operation S140 of magnetizing the metal piece 221, the metal piece 221 may be magnetized to magnetization strength in consideration of the aging of the magnet 220. As an example of the aging in operation S150, aging may be performed by maintaining the sensor target 200 with the magnetized metal piece 221 in a high temperature chamber at a temperature of about 160° C. for about 2 hours. The above-described temperature and time may be varied according to an available temperature of the wheel bearing.

Figure 11:
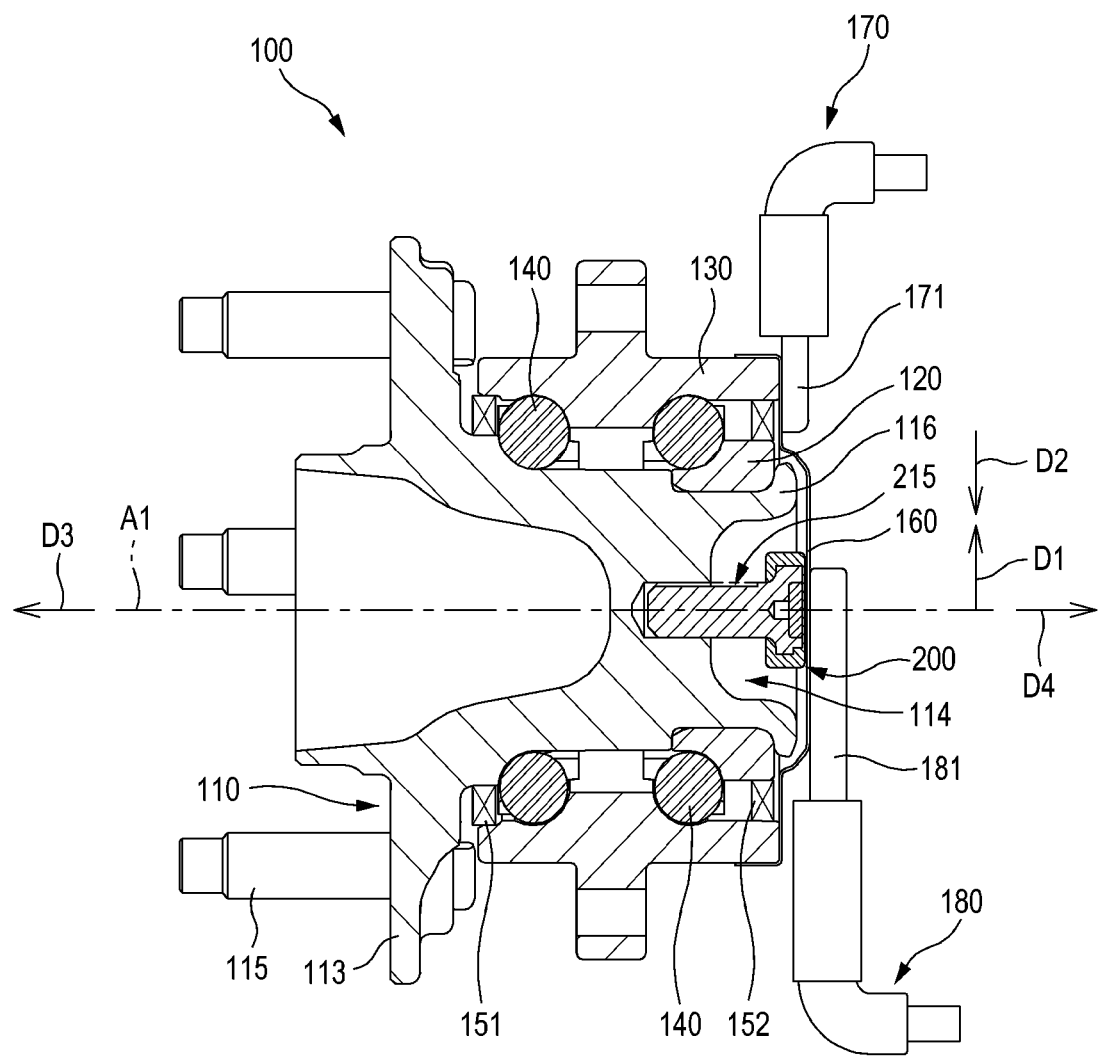
FIG. 11 is a longitudinal sectional view illustrating a wheel bearing comprising a sensor target according to one embodiment.
Figure 12:
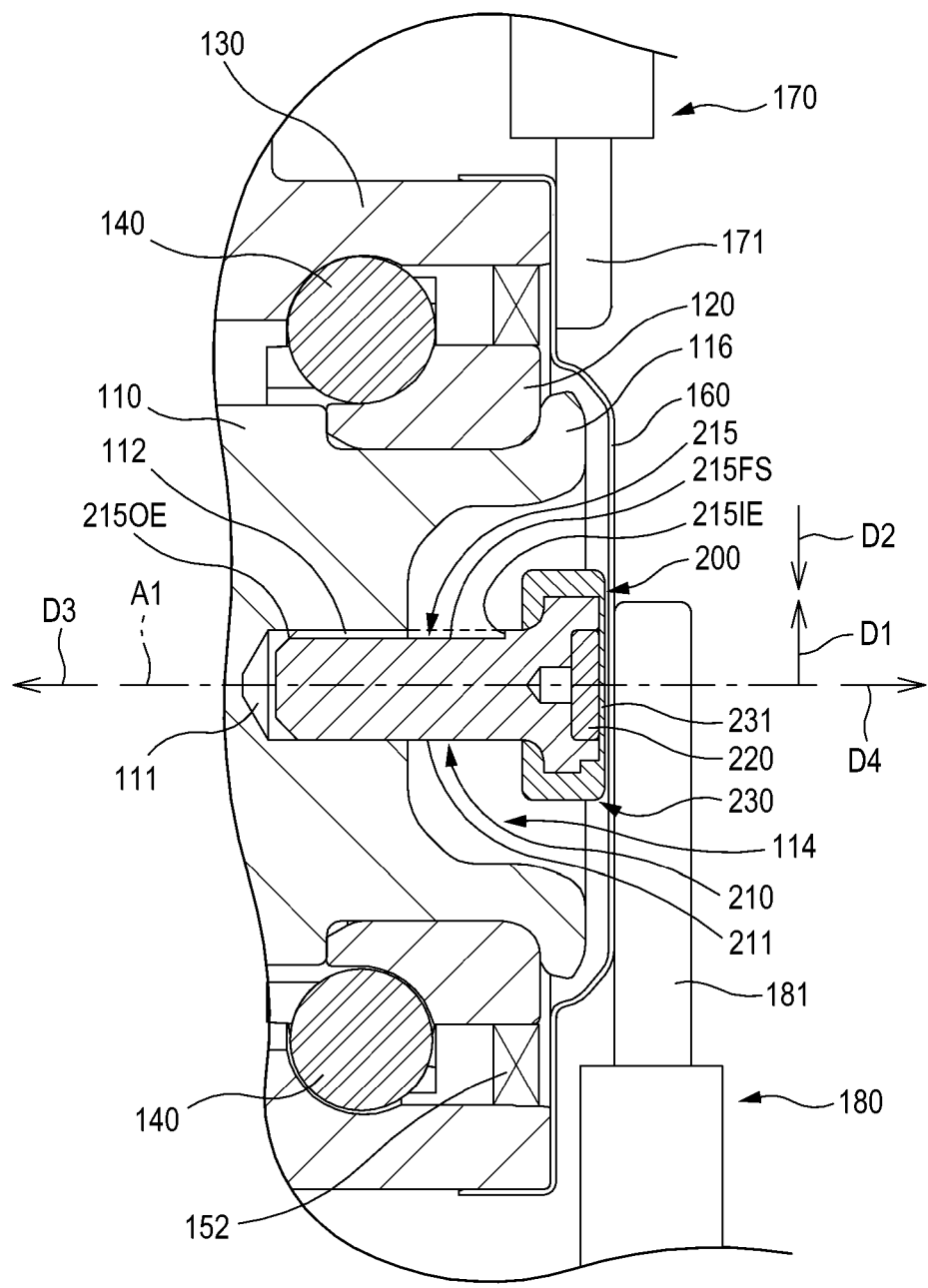
FIG. 12 is an enlarged longitudinal sectional view illustrating the sensor target which is press-fitted into the wheel bearing.

In order to explain a wheel bearing with the sensor target according to one embodiment. FIGS. 11 and 12 may be referred. Referring to an embodiment shown in FIGS. 11 and 12, a wheel bearing 100 according to one embodiment comprises a bearing hub 110, an inner ring 120, an outer ring 130, rolling elements 140, and the sensor target 200 according to one embodiment, which is press-fitted into the bearing hub 110, and at least one wheel sensor for detecting a rotation of a vehicle wheel by the sensor target 200.

The bearing hub 110 is configured to be coupled to a wheel of the vehicle, such as a driven wheel or a non-driven wheel, and to be rotated together with the wheel around the rotational axis A1. The bearing hub 110 shown in FIG. 11 may be coupled to a non-driven wheel. The bearing hub 110 has a cylindrical shape of which center portion is blocked. A flange 113 is formed at an end portion of the bearing hub 110 in an outward axial direction D3. The bearing hub 110 is coupled to the wheel at the flange 113 by a wheel bolt 115. A recess 114 which is concave in the outward axial direction D3 is provided at an end portion of the bearing hub 110 in an inward axial direction D4. The target mounting bore 111 is penetrated in a center of the recess 114 in coaxial with the rotational axis A1. Further, a caulking portion 116 is provided at the end portion of the bearing hub 110 in the inward axial direction D4. The caulking portion 116 may fix the inner ring 120 to an outer circumferential surface of the bearing hub 110 and apply a pre-pressure to the inner ring 120.

The inner ring 120 is engaged with the outer circumferential surface of the bearing hub 110. The outer circumferential surface of the bearing hub 110 is interference fitted to an inner circumferential surface of the inner ring 120 and the inner ring 120 is pressurized by the caulking portion 116 such that the inner ring 120 may be fixed to the bearing hub 110. Thus, the inner ring 120 is rotated with the bearing hub 110. The outer ring 130 is disposed to surround a portion of the bearing hub 110 and a portion of the inner ring 120. The outer ring 130 may be coupled and fixed to a part of a chassis of the vehicle (e.g., a knuckle (not shown)). A plurality of rolling elements 140 are disposed between the bearing hub 110 and the outer ring 130 and between the inner ring 120 and the outer ring 130. In the embodiment shown in FIG. 11, the rolling elements 140 are a ball, but rolling elements different from the ball may be employed in the wheel bearing 100. Further, according to the embodiment shown in FIG. 11, the wheel bearing 100 comprises an outer seal 151 and an inner seal 152, which prevent foreign materials from being introduced into a space in which the rolling elements 140 perform rolling movement. The outer seal 151 is fitted into an annular gap between the outer circumferential surface of the bearing hub 110 and an inner circumferential surface of the outer ring 130, and the inner seal 152 is fitted into an annular gap between an outer circumferential surface of the inner ring 120 and the inner circumferential surface of the outer ring 130.

The sensor target 200 according to one embodiment is press-fitted into the target mounting bore 111 of the bearing hub 110 in coaxial with the rotational axis A1. Referring to an embodiment shown in FIG. 12, the sensor target 200 is press-fitted into the target mounting bore 111 such that one end 215IE of the cut-out portion 215 is located outside the target mounting bore 111. Further, the sensor target 200 is press-fitted into the target mounting bore 111 such that an end of the magnet 220 in the inward axial direction D4 is located near an end of the caulking portion 116 in the inward axial direction D4. The airflow passage 112 which is defined by the cut-out portion 215 is formed between the bearing hub 110 and the sensor target 200 to allow a flow of air between the target mounting bore 111 and the outside of the bearing hub 110. When the sensor target 200 is press-fitted into the target mounting bore 111, air in the target mounting bore 111, which is compressed by the end surface of the other end 211OE of the sensor target 200, is discharged to the outside of the target mounting bore 111 through the airflow passage 112. Therefore, atmospheric air is present between the blocked end of the target mounting bore 111 and the other end of the sensor target 200 such that the sensor target 200 may be permanently maintained at the press-fitted position without movement from the press-fitted position.

Further, the wheel bearing 100 according to one embodiment comprises a sensor cap 160 for covering the sensor target 200 to protect the sensor target 200 from foreign materials. The sensor cap 160 may be press-fitted into an outer circumferential surface of the outer ring 130 and fixed to the outer ring 130.

In one embodiment, the wheel bearing 100 comprises at least one wheel sensor configured to detect a rotation of the wheel by the sensor target 200. The wheel sensor may be fixed relative to the bearing hub 110. Referring to the embodiment shown in FIGS. 11 and 12, the wheel bearing 100 according to one embodiment comprises a first wheel sensor 170 and a second wheel sensor 180 as the at least one wheel sensor. For example, the first wheel sensor 170 and the second wheel sensor 180 may be detachably coupled to a knuckle or other chassis component, thereby being fixed relative to the bearing hub 110. A wheel bearing according to another embodiment may comprise any one of the first wheel sensor 170 and the second wheel sensor 180 and may further comprise a wheel sensor in addition to the first wheel sensor 170 and the second wheel sensor 180.

The first wheel sensor 170 may be a sensor for detecting a speed of the wheel and may be used for an anti-lock brake system. The first wheel sensor 170 comprises a detection part 171 facing the magnet 220 in an outward radial direction DI of the rotational axis A1. The detection part 171 comprises a detection element therein which is capable of detecting a variation in magnetic field of the magnet 220 which is being rotated.

The second wheel sensor 180 comprises a detection part 181 facing the magnet 220 along the rotational axis A1. The detection part 181 comprises a detection element therein which is capable of detecting a variation in magnetic field of the magnet 220 which is being rotated. The second wheel sensor 180 may be configured to detect a rotation angle of the wheel from the variation in magnetic field of the magnet 220 with high resolution. According to the embodiment shown in FIG. 12, a surface of the detection part 181 may be in close contact with a surface of the sensor cap 160. A slight gap may be present between the sensor cap 160 and the disc portion 231 of the housing 230, or the sensor cap 160 may be in close contact with the disc portion 231 of and the housing 230. In one embodiment, a thickness of the disc portion 231 along rotational axis A1 may be 0.6 mm or less. That is, the housing 230 minimizes a distance between the magnet 220 and the detection part 181 while covering the magnet 220 to prevent separation of the magnet 220. Therefore, the sensor target 200 according to one embodiment may achieve fixing of the magnet 220 with high reliability, may minimize the distance between the magnet 220 and the detection part 181, and may implement a compact structure of the wheel bearing 100.

Alternatively, the shaft 210 may have a polygonal transverse sectional shape, and the target mounting bore 111 may have a transverse sectional shape corresponding to the polygonal transverse sectional shape of the shaft 210. The magnet 220 may have a quadrangular shape or a long elliptical plate shape, and the recess 213 may have a shape which allows the magnet having such a shape to be press-fitted thereinto.

Alternatively, the shaft 210 may not have the flange 216. In such an embodiment, the recess 213 may be formed on an end surface of one end of the cylindrical body 211 of the shaft 210. Further, the body 211 of the shaft 210 may have a portion for fixing between the body 211 and the housing 230.

As another embodiment, the cut-out portion 215 may not have the flat surface 215FS and may have a shape of a groove having a concave surface. Alternatively, a plurality of cut-out portions 215 may be formed on the outer circumferential surface of the shaft 210. The cut-out portion 215 may extend in a curved shape.

In another embodiment, the sensor target 200 may be press-fitted into the target mounting bore 111 such that an end of the magnet 220 in the inward axial direction D4 is located on the same line as an end of the caulking portion 116 in the inward axial direction D4 or is spaced apart in the axial direction D3 than the end of the caulking portion 116. Alternatively, the sensor cap 160 may have a convex shape in the outward axial direction D3 or the inward axial direction D4 according to a position of the magnet 220 with respect to the end of the caulking portion 116.

In another embodiment, the manufacturing method of the sensor target may not comprise the forming of the housing 230 (S130). In this case, after the operation S140 of magnetizing the metal piece 221, the operation S150 of aging the metal piece 221 may be performed.

In another embodiment, the manufacturing method of a sensor target may comprise press-fitting the fully magnetized magnet 220 into the recess 213 instead of the press-fitting of the magnetizable metal piece 221 into the recess 213. In this embodiment, the forming of the housing 230 may be omitted.

In another embodiment, the wheel bearing may be configured such that the bearing hub 110 is not in contact with the rolling elements 140, and only the inner ring 120 and the outer ring 130 are in contact with the rolling elements 140. The wheel bearing may not comprise the inner ring 120 and may comprise the rolling elements 140 disposed between the bearing hub 110 and the outer ring 130 and the bearing hub 110 and the outer ring 130.

In the above-described embodiments, the bearing hub 110 is described as the rotating element of the wheel bearing into which the sensor target 200 is press-fitted. The rotating element of the wheel bearing into which the sensor target 200 is press-fitted may be any rotating element among the components of the wheel bearing. For example, the inner ring of the wheel bearing may be formed to cover the bearing hub, and the sensor target may be press-fitted into the inner ring in coaxial with a rotational axis of the inner ring. Further, the sensor target according to one embodiment may be mounted to a bearing hub for a driven wheel in addition to the bearing hub 110 for a non-driven wheel shown in FIG. 11.

Although the technical spirit of the present disclosure has been described using some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A sensor target fixed to a rotating element of a wheel bearing, the sensor target comprising:
    a shaft configured to be press-fitted into the rotating element in coaxial with a rotational axis of the rotating element and having a recess at one end in a length direction; and
    a magnet fixed in the recess,
    wherein the magnet is press-fitted into the recess to be fixed in the recess.

2. The sensor target of claim 1, wherein:
    at least one cut-out portion extending from the other end, which is opposite the one end, toward the one end in the length direction is provided on an outer circumferential surface of the shaft; and
    the cut-out portion is configured to define an airflow passage between the rotating element and the shaft.

3. The sensor target of claim 1, wherein at least one hole, which accommodates air compressed by the magnet, is provided in the recess of the shaft.

4. The sensor target of claim 1, further comprising:
a housing configured to cover the magnet fixed in the recess and the one end of the shaft.

5. The sensor target of claim 4, wherein the shaft comprises a rotation preventing portion, which is filled with a portion of the housing and prevents a rotation of the housing relative to the shaft.

6. The sensor target of claim 5, wherein the rotation preventing portion is formed of one among a concave portion, a hole, a cut-out portion, and a groove.

7. The sensor target of claim 5, wherein:
a cut-out portion configured to define an airflow passage between the rotating element and the shaft is provided on an outer circumferential surface of the shaft; and
the rotation preventing portion is located at the opposite side of the cut-out portion based on a central axis of the shaft.

8. The sensor target of claim 4, wherein:
a flange protruding in an outward radial direction of a central axis of the shaft is provided at the one end of the shaft; and
the housing is configured to cover the magnet and the flange.

9. A manufacturing method of a sensor target fixed to a rotating element of a wheel bearing, the method comprising:
providing a shaft configured to be press-fitted into the rotating element in coaxial with a rotational axis of the rotating element and having a recess at one end in a length direction;
press-fitting a magnetizable metal piece into the recess; and
magnetizing the metal piece.

10. The method of claim 9, wherein the providing of the shaft comprises forming at least one cut-out portion extending from the other end, which is opposite the one end, toward the one end in the length direction on an outer circumferential surface of the shaft.

11. The method of claim 9, wherein:
the providing of the shaft comprises forming at least one hole in the recess; and
air in the recess, which is compressed by the metal piece, accommodated in the hole through the press-fitting of the magnetizable metal piece into the recess.

12. The method of claim 9, further comprising:
before the magnetizing of the metal piece, performing injection molding on the one end of the shaft into which the metal piece is press-fitted to form a housing which covers the metal piece and the one end of the shaft.

13. The method of claim 9, wherein the providing of the shaft comprises forming a rotation preventing portion, which is filled with molten plastic material, on the shaft.

14. The method of claim 9, further comprising:
aging the magnetized metal piece at a predetermined temperature.

15. A wheel bearing, comprising:
a bearing hub configured to be coupled to a wheel of a vehicle and to be rotated with the wheel around a rotational axis;
an outer ring configured to surround a portion of the bearing hub;
a plurality of rolling elements disposed between the bearing hub and the outer ring;
a sensor target fixed to the bearing hub; and
at least one wheel sensor fixed relative to the bearing hub and configured to detect a rotation of the wheel by the sensor target,
wherein the sensor target comprises:
a shaft having a recess located at one end in a length direction and at least one cut-out portion extending from the other end, which is opposite the one end, toward the one end in the length direction and located on an outer circumferential surface thereof; the shaft configured to be press-fitted into the bearing hub in coaxial with the rotational axis; and
a magnet press-fitted into the recess.

16. The wheel bearing of claim 15, wherein an airflow passage is formed between the bearing hub and the shaft due to the cut-out portion.

17. The wheel bearing of claim 15, wherein at least one hole, which accommodates air compressed by the magnet, is provided in the recess of the shaft.

18. The wheel bearing of claim 15, wherein the sensor target further includes a housing which covers the magnet press-fitted into the recess and the one end of the shaft.

19. The wheel bearing of claim 15, wherein the at least one wheel sensor comprises a detection part facing the magnet in a direction of the rotational axis or in an outward radial direction of the rotational axis.

* * * * *